United States Patent [19]
Snyder et al.

[11] 3,787,033
[45] Jan. 22, 1974

[54] JOINT FOR TUBULAR STRUCTURE
[75] Inventors: Donald E. Snyder, La Habra; Roy W. Batcheller, West Covina, both of Calif.
[73] Assignee: Crane-Veyor Corporation, South El Monte, Calif.
[22] Filed: Aug. 14, 1972
[21] Appl. No.: 280,516

[52] U.S. Cl.................. 256/59, 256/65, 287/54
[51] Int. Cl............................................. E04h 17/14
[58] Field of Search............ 256/21, 22, 24, 59, 65; 287/56, 54 C

[56] References Cited
UNITED STATES PATENTS

| | | | |
|---|---|---|---|
| 2,150,651 | 3/1939 | Ewing | 256/22 X |
| 1,840,048 | 1/1932 | Michelman | 256/65 X |
| 2,018,250 | 10/1935 | Cohan | 287/54 C |
| 2,242,427 | 5/1941 | Heanue | 287/54 C X |
| 2,496,032 | 1/1950 | Austin | 287/54 C |
| 2,999,671 | 9/1961 | Blayden | 256/65 |
| 3,333,873 | 8/1967 | Triplett | 287/56 X |

Primary Examiner—Dennis L. Taylor

[57] ABSTRACT

A tubular structure has end posts, intermediate posts and rails which extend between the end posts and intermediate posts. For fastening the rails to a post use is made of a T joint at the top of the post and a cross joint at an intermediate location. For the cross leg of the T joint a hole is made on one side of the cross leg of the same diameter as the post, a square end of the post is pushed in the hole and a weld is applied on the interior of the cross leg to anchor the parts together. A sleeve is inserted into the end of the cross leg with part protruding and this also anchored by a weld applied to the interior. Each end of the rail is then merely slid over the protruding part of the sleeve at each opposite post and no welding appears on the exterior which may need to be ground off.

7 Claims, 7 Drawing Figures

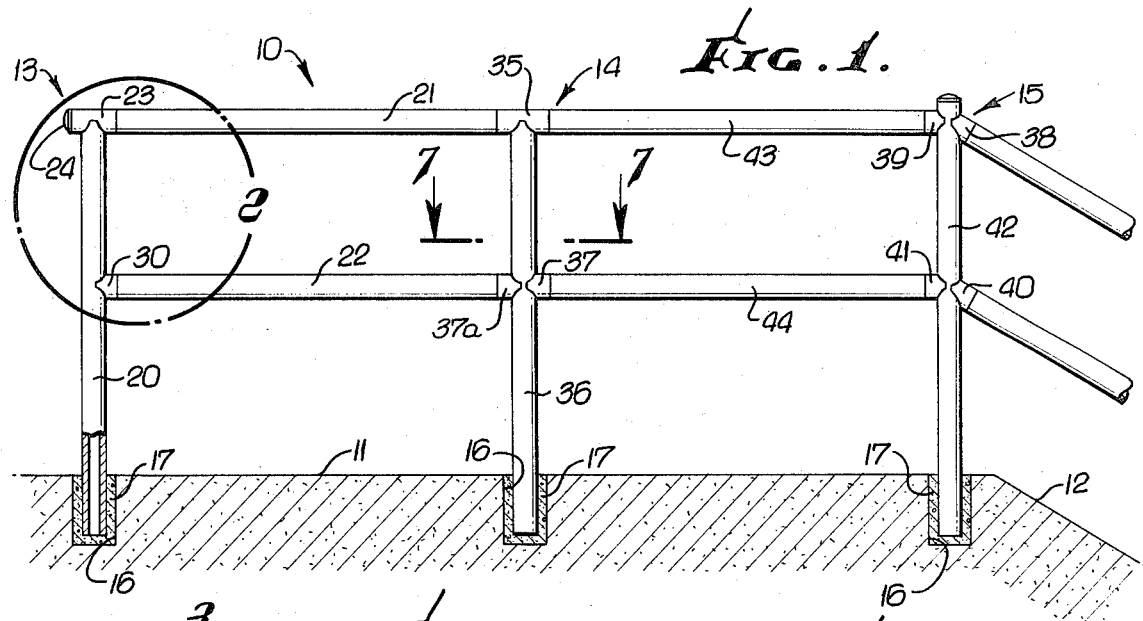
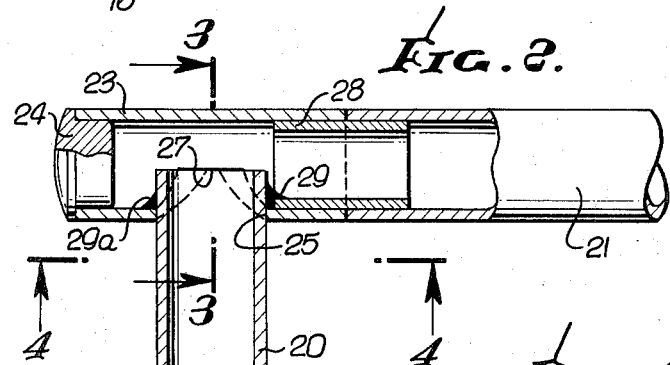
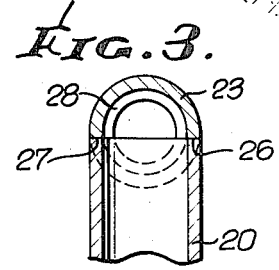
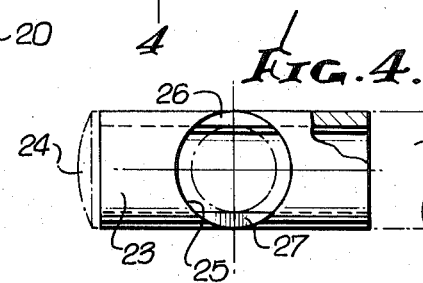
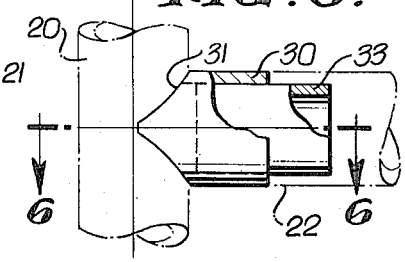
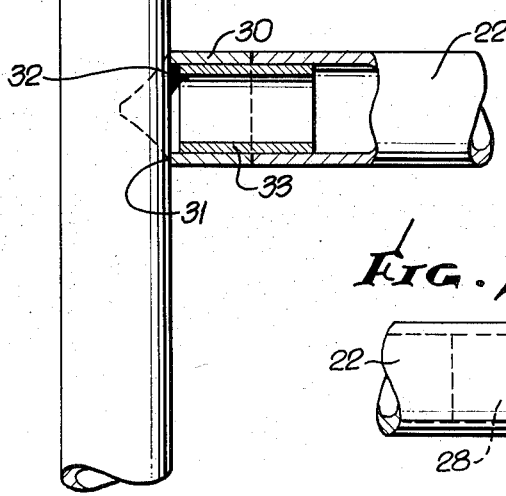
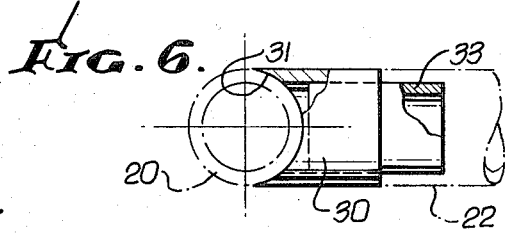
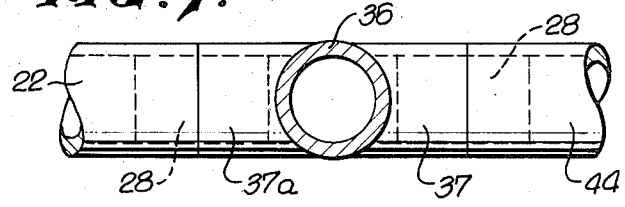

JOINT FOR TUBULAR STRUCTURE

Although hand rails made of tubular stock of some kind are in wide and common use for balconies, stairways, walkways and the like, there are features inherent in conventional construction which meet some objection. Concededly, hand rails made of iron pipe with threaded fittings are low in cost and provide adequate strength but they are not capable of presenting a finished neat appearance, they require appreciable maintenance because of the material from which they are made and are time-consuming to install.

Where welded tubing has been resorted to, it has not been found feasible to assemble all parts on the site and a problem arises when subassemblies consisting of posts with necessary fittings are awkward to store and transport to the site where the installation is to be made. On those occasions where tubular assemblies employ welded fittings, the welds have been made on the exterior and in order to offer a smooth, neat, finished appearance welds have had to be ground off, adding to the cost. Where posts provided with adequate fittings have been made of material such as aluminum with fittings welded in place, anodizing or otherwise treating the subassembled posts and fittings has presented problems in that large treating tanks are invariably necessary because of the size of the subassemblies, especially in that all exterior welds must be completed and finished before the treating step.

It is therefore among the objects of the invention to provide a new and improved tubular structure which is relatively low in cost and which presents an especially acceptable neat appearance when completed and installed.

Another object of the invention is to provide a new and improved joint for tubular structure wherein all welding operations are entirely on the interior of the tubular units, thereby preserving a smooth and neat exterior surface on which no special machining needs to be performed.

Still another object of the invention is to provide a new and improved joint for tubular structure which by confining all welding to the interior and by maintaining fittings relatively small in length and of adequate design, makes it possible to employ subassemblies of posts with fittings which occupy virtually a minimum amount of room thereby making possible the use of relatively small tanks in treating the exterior and also making transportation to the site where the structure is to be installed less awkward and, consequently, cheaper.

Further included among the objects of the invention is to provide a new and improved joint for tubular structure of such design and character that when necessary the entire structure can be erected at the site, special construction being confined to the posts and, hence, making it possible to employ straight tubular sections for the rails which need no special handling or fitting other than to be cut off to proper length, the structure moreover being free of employment of mechanical fasteners which, if used, might readily corrode or work loose.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is an elevational view of a finished tubular structure in place on the site where it is to be used.

FIG. 2 is an elevational view partially in section taken on the circular line 2 of FIG. 1.

FIG. 3 is a fragmentary longitudinal sectional view on the line 3—3 of FIG. 2.

FIG. 4 is a cross sectional view taken on the line 4—4 of FIG. 2.

FIG. 5 is a fragmentary elevational phantom view of the joint intermediate the top and bottom of a post.

FIG. 6 is a cross sectional view on the line 6—6 of FIG. 5.

FIG. 7 is a cross sectional view on the line 7—7 of FIG. 1.

In an embodiment of the invention chosen for the purpose of illustration there is shown a tubular structure indicated generally by the reference character 10 which consists of a hand raid extending across a horizontal surface 11 and directed downwardly over a sloping surface 12. In the chosen embodiment there is an end post assembly 13 and two intermediate post assemblies 14 and 15. Holes 16 are initially made in the surface 11 for reception of the post assemblies set in grout or concrete 17.

For the end post assembly 13, by way of example, there is provided a vertical post 20 having a top fitting for a rail 21 and an intermediate fitting for a rail 22. The top fitting consists of a tubular leg member 23 one end of which protrudes on one side of the post 20 and the other end of which protrudes on the other. Inasmuch as this is an end post assembly, a cap 24 is used to close the opening in the otherwise exposed lefthand end of the tubular leg member 23.

As shown to good advantage in FIGS. 2, 3, and 4, a hole 25 is made on one side of the tubular leg member 23 at a location intermediate opposite ends, the hole 25 being of substantially the same diameter as the outside diameter of the post 20. The hole, moreover, extends into the tubular leg member 23 a distance about equal to its radius. Forming the hole as described and of the diameter made reference to, the hole appears to have a somewhat V shape when viewed in side elevation as shown in FIG. 1. There are also provided shoulders 26 and 27, present because of the thickness of the wall of the tubular leg member 23, where the hole stops at the diametrical midpoint.

When the tubular leg member is applied to the top of the post to form the fitting, the post is pushed into the hole 25 to its full depth until it abuts the shoulders 26 and 27 and there held while a weldment 29a is made on the interior of the tubular leg member around the outside circumference of the post at a location inside the tubular leg member.

For this particular end post assembly, one end only of the tubular leg member is provided with a cylindrical retainer 28 here having the form of a sleeve. The exterior circumference of the retainer 28 is of such dimension as provides a sliding fit within the inside circumference of the leg member 23, the length of the retainer being such that when it abuts the exterior of the leg 20 during makeup of the joint, or perhaps the weldment extending around it, there is an appreciable portion of the retainer extending beyond the outermost end of the leg member. A weldment 29, entirely on the interior, is employed to anchor the retainer in position within the end of the leg member.

In order to preserve the structural strength as well as the appearance of the post 20, the fitting intermediate the top and the bottom of the post is constructed somewhat differently from that at the top. To accomplish this use is made of a tubular mid-position leg 30 provided with a notch 31 at one end which has a shape complementary to the exterior contour of the post 20. The mid-position leg 30 is secured to the post 20 by an interior weldment 32. The same weldment 32 may be employed to anchor in position a cylindrical retainer 33 here likewise having the form of a sleeve, one portion of which is located entirely within the mid-position leg and another portion of which is exposed.

A tubular leg member 35 for the intermediate post assembly 14 is mounted on a post 36 in the same manner as the tubular leg member 23 except that there are two cylindrical retainers, one on each end of the leg member, which are installed and anchored in the same manner as the cylindrical retainer 28. Similarly, intermediate the top and the bottom of the post, there are two mid-position legs 37 and 37a constructed and mounted in position in a manner similar to that described for the mid-position leg 30.

For the intermediate post assembly 15 where a horizontal relationship no longer prevails, tubular leg members 38, 39, 40 and 41 are all fastened to a post 42 in the same manner as has been described for the tubular mid-position leg 30, the only difference being that notches for the leg members 38 and 40 need be made in an oblique direction to conform to the angular relationship desired.

When the structural assembly is to be installed, the holes 16 are made in proper alignment following conventional practice. Post assemblies 13, 14, 15, etc., are then laid out ready for erection. By measuring center line to center line of the holes 16 the length of rails 21, 22, 43, 44, etc., can be determined by subtracting from the center line to center line distance a length equivalent to that occupied by the tubular leg members involved. In actual practice this is a distance of about 5 inches when 1 ½ inch tubing is employed. The rails are cut off square and need no machining other than to trim off possible burrs. With all parts ready for installation, as described, a quantity of quick-setting cement is poured into the bottom of the holes 16, rails are applied over the cylindrical retainers protruding from the legs on the post assemblies and the posts then set in the holes 16 where initially they may be wedged in position by employment of conventional wooden wedges. To prevent the rails from rotating, epoxy adhesive may be applied to the interiors of the ends of the rails where they are applied over the retainers. The posts are plumbed and aligned until the cement sets after which wedges are removed and the holes then filled with cement. Constructed and erected as described, exteriors of the posts, legs and rails are entirely clean, and a finished installation is achieved without need for further work other than a final wiping off of the exteriors to remove soil accumulated during installation.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A tubular structure comprising tubular post memebers and tubular rails of the same outside diameter, a tubular leg member for each post member of the same diameter as said post member, one of said members having a recess therein of shape complementary to the shape of the exterior of an adjacent joining portion of the other of said members, a cylindrical retainer of exterior diameter substantially the same as the interior diameter of said members, one end of the retainer and the member having the recess being anchored to the other member by the same interior weldment, the other end of said retainer having a portion thereof protruding for reception of an end of one of said rails, both said members having in assembled condition a clear and uninterrupted exterior surface exclusive of said recess.

2. A tubular structure comprising tubular posts and tubular rails of the same outside diameter with all anchoring welds applied to the interior comprising a tubular leg for the top of each post having the same outside diameter as the post, means forming a hole in one side of the leg of diameter equal to the outside diameter of the post and extending inwardly to a distance substantially equal to one half the diameter, a cylindrical retainer having an outside diameter substantially equal to the inside diameter of the leg, one end portion of the retainer extending into the leg to about a position of abutment with the post and the other end portion being exposed beyond the adjacent end of the leg, and a weldment at the interior only of said leg anchoring said leg and said retainer jointly to the post whereby to present an exterior free of weldment for reception a rail end applied over the exposed other end of said retainer.

3. A tubular structure as in claim 2 wherein for an intermediate post there is a cylindrical retainer at each end of the leg and an interior weldment jointly securing each retainer and the leg to the post.

4. A tubular structure as in claim 2 wherein there is a tubular midposition leg of outside diameter equal to the outside diameter of the post and at a location intermediate opposite ends of the post, one end of said midposition leg having a notch therein of shape complementary to the exterior of the leg for a distance of one half the outside circumference, a cylcylindrical retainer of outside diameter substantially equal to the inside diameter of the midposition leg, said cylindrical retainer and said midposition leg being jointly anchored to the post by a single interior weldment, for reception of the end of a midposition rail.

5. A tubular structure as in claim 4 wherein there is a midposition leg on each diametrical side of the post and a cylindrical retainer in each midposition leg, both said midposition legs and respective retainers being each jointly anchored to the post by a single interior weldment.

6. A tubular structure as in claim 1 wherein said rails comprise hollow tubular elements with square cut ends.

7. A tubular structure as in claim 5 wherein all said rails comprise each a hollow tubular element with square cut ends, and of uniform continuous inside and outside diameter.

* * * * *